United States Patent
Li

(10) Patent No.: US 10,284,086 B2
(45) Date of Patent: May 7, 2019

(54) BOOST CONVERTER AND THE METHOD THEREOF

(71) Applicant: Monolithic Power Systems, Inc., San Jose, CA (US)

(72) Inventor: Yike Li, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 14 days.

(21) Appl. No.: 15/338,234

(22) Filed: Oct. 28, 2016

(65) Prior Publication Data

US 2017/0126129 A1 May 4, 2017

(30) Foreign Application Priority Data

Oct. 28, 2015 (CN) .......................... 2015 1 0712634

(51) Int. Cl.
*H02M 1/08* (2006.01)
*H02M 3/158* (2006.01)
*H02M 1/00* (2006.01)

(52) U.S. Cl.
CPC ............ *H02M 3/158* (2013.01); *H02M 1/08* (2013.01); *H02M 3/1588* (2013.01); *H02M 2001/0009* (2013.01); *Y02B 70/1466* (2013.01)

(58) Field of Classification Search
CPC .... H02M 1/4225; H02M 3/156; H02M 3/158; H02M 2003/1566; H02M 3/1588; H02M 2003/1552; G05F 1/62
USPC ........................................................ 323/271
See application file for complete search history.

(56) References Cited

U.S. PATENT DOCUMENTS

| | | | |
|---|---|---|---|
| 6,839,247 B1 * | 1/2005 | Yang | H02M 1/4225 363/21.07 |
| 8,198,880 B2 | 6/2012 | Ouyang | |
| 8,400,129 B2 | 3/2013 | Ouyang | |
| 8,717,002 B2 | 5/2014 | Xi | |
| 8,749,216 B2 | 6/2014 | Li et al. | |
| 8,872,501 B2 | 10/2014 | Dong et al. | |
| 8,917,073 B2 | 12/2014 | Yang et al. | |
| 8,963,523 B2 | 2/2015 | Wang | |
| 8,970,194 B2 | 3/2015 | Li | |
| 9,041,373 B2 | 5/2015 | Jiang et al. | |
| 9,041,377 B2 | 5/2015 | Wang et al. | |
| 9,093,909 B2 | 7/2015 | Wang et al. | |
| 9,190,895 B1 * | 11/2015 | Chen | H05B 33/08 |
| 9,270,176 B1 | 2/2016 | Nguyen et al. | |
| 9,356,510 B2 | 5/2016 | Jiang et al. | |
| 9,362,824 B2 | 6/2016 | Ouyang | |
| 9,479,043 B2 | 10/2016 | Jiang et al. | |

(Continued)

*Primary Examiner* — Harry R Behm
*Assistant Examiner* — Lorena D Bruner
(74) *Attorney, Agent, or Firm* — Perkins Coie LLP

(57) ABSTRACT

A boost converter having an inductor having a first terminal coupled to an input port to receive the input voltage; a high side switch coupled between the inductor and an output port; a low side switch coupled between the inductor and a ground reference; and a control circuit configured to receive a feedback signal indicative of the output voltage and a reference signal, and to provide a high side control signal and a low side control signal based on the feedback signal and the reference signal; wherein the low side switch on time period is controlled to be constant by the low side control signal when the input voltage and the output voltage are fixed.

12 Claims, 5 Drawing Sheets

(56) References Cited

U.S. PATENT DOCUMENTS

| | | | | |
|---|---|---|---|---|
| 2008/0203988 | A1* | 8/2008 | Horikawa | G06G 7/14 323/282 |
| 2012/0194152 | A1* | 8/2012 | Martinelli | H02M 3/158 323/282 |
| 2013/0257403 | A1* | 10/2013 | Yen | H02M 3/156 323/283 |
| 2014/0203761 | A1* | 7/2014 | Paparrizos | H02M 3/1582 320/107 |
| 2014/0354250 | A1* | 12/2014 | Deng | H02M 3/157 323/271 |
| 2015/0042306 | A1* | 2/2015 | Kim | G05F 1/561 323/350 |
| 2015/0188433 | A1 | 7/2015 | Jiang et al. | |
| 2015/0244262 | A1 | 8/2015 | Ouyang | |
| 2015/0311798 | A1 | 10/2015 | Yuan et al. | |
| 2015/0362937 | A1* | 12/2015 | Wang | H02M 3/156 323/281 |
| 2015/0381049 | A1 | 12/2015 | Li | |
| 2015/0381051 | A1* | 12/2015 | Li | H02M 3/156 323/271 |
| 2016/0164416 | A1 | 6/2016 | Li | |
| 2016/0226382 | A1 | 8/2016 | Li | |

\* cited by examiner

BOOST CONVERTER AND THE METHOD THEREOF

CROSS-REFERENCE TO RELATED APPLICATIONS

This application claims priority to and the benefit of Chinese Patent Application No. 201510712634.4, filed on Oct. 28, 2015, which is incorporated herein by reference in its entirety.

FIELD

The present invention relates generally to electronic circuits, and more particularly but not exclusively to boost converters and the method thereof.

BACKGROUND

Peak current mode control is widely adopted in conventional boost converters. However, there is a compromise between bandwidth and steady requirement in boost converter with peak current mode control. In other words, the transient response of the conventional boost converter with peak current mode control is usually slow.

As a result, there is a need for boost converter with high bandwidth and simple circuit.

SUMMARY

It is an object of the present invention to provide a boost converter with constant on time control so as to achieve high bandwidth and simple structure.

In accomplishing the above and other objects, there has been provided, in accordance with an embodiment of the present invention, a boost converter, comprising: an input port configured to receive an input voltage; an output port configured to provide an output voltage; an inductor having a first terminal coupled to the input port to receive the input voltage, and a second terminal; a high side switch having a first terminal coupled to the second terminal of the inductor, a second terminal coupled to the output port, and a control terminal configured to receive a high side control signal; a low side switch having a first terminal coupled to the second terminal of the inductor, a second terminal coupled to a ground reference, and a control terminal configured to receive a low side control signal; and a control circuit having a first input terminal configured to receive a feedback signal indicative of the output voltage, a second input terminal configured to receive a reference signal, a first output terminal and a second output terminal respectively provide the high side control signal and the low side control signal based on the feedback signal and the reference signal; wherein the low side switch on time period is controlled to be constant by the low side control signal when the input voltage and the output voltage are fixed.

In accomplishing the above and other objects, there has been provided, in accordance with an embodiment of the present invention, a control circuit of a boost converter having a high side switch, a low side switch and an inductor, the control circuit comprising: a feedback amplifier having a first input terminal, a second input terminal and an output terminal, wherein the first input terminal is configured to receive a reference signal, the second input terminal is configured to receive a feedback signal indicative of an output voltage of the boost converter, and the output terminal is configured to provide a voltage control signal indicative of an error between the reference signal and the feedback signal; a feedback comparator having a first input terminal, a second input terminal and an output terminal, wherein the first input terminal is configured to receive a current sense signal indicative of a current flowing through the high side switch, the second input terminal is coupled to the output terminal of the feedback amplifier to receive the voltage control signal, and the output terminal is configured to provide an on trigger signal based on the current sense signal and the voltage control signal; an on time control circuit having a first input terminal, a second input terminal, a third input terminal and an output terminal, wherein the first input terminal is configured to receive an input voltage of the boost converter, the second input terminal is configured to receive the output voltage, the third input terminal is configured to receive a low side control signal controlling on and off of the low side switch, and the output terminal is configured to provide an off trigger signal based on the input voltage, the output voltage and the low side control signal; and a logic circuit having a first input terminal, a second input terminal, a first output terminal and a second output terminal, wherein the first input terminal is coupled to the output terminal of the feedback comparator to receive the on trigger signal, the second input terminal is coupled to the output terminal of the on time control circuit to receive the off trigger signal, the first output terminal and the second output terminal are configured to respectively provide the high side control signal and the low side control signal based on the on trigger signal and the off trigger signal; wherein the low side switch on time period is initiated by the on trigger signal, and is terminated by the off trigger signal, and wherein the low side switch on time period is controlled to be constant when the input voltage and the output voltage are fixed.

In accomplishing the above and other objects, there has been provided, in accordance with an embodiment of the present invention, a control method for a boost converter, wherein the boost converter converts an input voltage to an output voltage, and comprises an inductor, a high side switch coupled between the inductor and the output voltage, and a low side switch coupled between the inductor and a ground reference, the control method comprising: generating a voltage control signal based on an error between a reference signal and a feedback signal indicative of the output voltage; generating an on trigger signal based on a comparing result of the voltage control signal and a current sense signal indicative of a current flowing through the high side switch; generating a low side control signal based on the on trigger signal and an off trigger signal; generating the off trigger signal based on the input voltage, the output voltage and the low side control signal; and controlling the low side switch by the low side control signal; wherein the low side switch on time period is controlled to be constant while the input voltage and the output voltage are fixed.

The presented boost converter has high bandwidth and simple circuit structure. Furthermore, the presented boost converter has high efficiency under light load condition.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
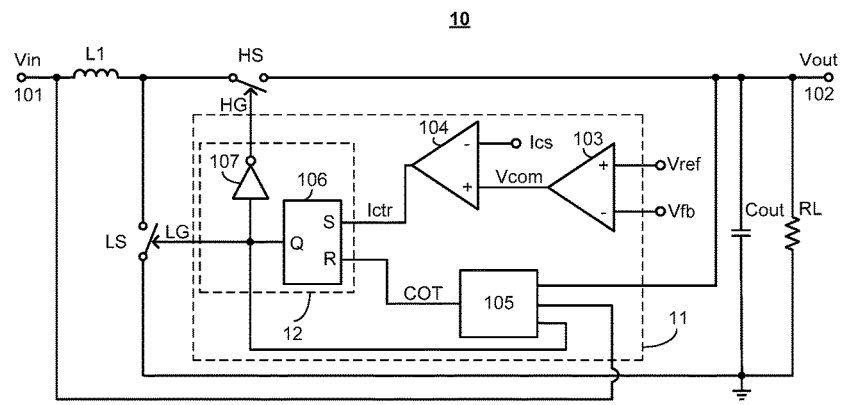
FIG. 1 schematically shows a boost converter 10 in accordance with an embodiment of the present invention.

FIG. 1 schematically shows a boost converter 10 in accordance with an embodiment of the present invention. As shown in FIG. 1, the boost converter 10 comprises: an input port 101 configured to receive an input voltage Vin; an output port 102 configured to provide an output voltage Vout; an inductor L1 having a first terminal and a second terminal, wherein the first terminal is coupled to the input port 101 to receive the input voltage Vin; a high side switch HS having a first terminal, a second terminal and a control terminal, wherein the first terminal is coupled to the second terminal of the inductor L1, the second terminal is coupled to the output port 102, and the control terminal is configured to receive a high side control signal HG; a low side switch LS having a first terminal, a second terminal and a control terminal, wherein the first terminal is coupled to the second terminal of the inductor L1, the second terminal is coupled to a ground reference GND, and the control terminal is configured to receive a low side control signal LG; and a control circuit 11 having a first input terminal, a second input terminal, a first output terminal and a second output terminal, wherein the first input terminal is configured to receive a feedback signal Vfb indicative of the output voltage Vout, the second input terminal is configured to receive a reference signal Vref, and wherein based on the feedback signal Vfb and the reference signal Vref, the control circuit 11 provides the high side control signal HG at the first output terminal and provides the low side control signal LG at the second output terminal, and wherein the low side switch LS on time period Ton is controlled to be constant by the low side control signal.

As shown in FIG. 1, the boost converter 10 further comprises an output capacitor Cout coupled between the output port 102 and the ground reference GND. Meanwhile, a load of the boost converter 10 is represented by a resistor RL.

The high side switch HS and the low side switch LS comprise any controllable semiconductor device, e.g., MOSFET (Metal Oxide Semiconductor Field Effect Transistor), BJT (Bipolar Junction Transistor) and so on.

In one embodiment, the control circuit 11 comprises: a feedback amplifier 103 having a first input terminal (non-inverting terminal), a second input terminal (inverting terminal) and an output terminal, wherein the first input terminal is configured to receive the reference signal Vref, the second input terminal is configured to receive the feedback signal Vfb, and wherein based on the reference signal Vref and the feedback signal Vfb, the feedback amplifier 103 provides a voltage control signal Vcom indicative of an error between the reference signal Vref and the feedback signal Vfb at the output terminal; a comparator 104 having a first input terminal (inverting terminal), a second input terminal (non-inverting terminal) and an output terminal, wherein the first input terminal is configured to receive a current sense signal Ics indicative of a current flowing through the high side switch HS, the second input terminal is coupled to the output terminal of the feedback amplifier 103 to receive the voltage control signal Vcom, and wherein based on the current sense signal Ics and the voltage control signal Vcom, the comparator 104 provides an on trigger signal Ictr at the output terminal; an on time control circuit 105 having a first input terminal, a second input terminal, a third input terminal and an output terminal, wherein the input terminal is configured to receive the input voltage Vin, the second input terminal is configured to receive the output voltage Vout, and the third input terminal is configured to receive the low side control signal LG, and wherein based on the input voltage Vin, the output voltage Vout and the low side control signal LG, the on time control circuit 105 provides an off trigger signal COT at the output terminal; and a logic circuit 12 having a first input terminal, a second input terminal, a first output terminal and a second output terminal, wherein the first input terminal is coupled to the output terminal of the comparator 104 to receive the on trigger signal Ictr, the second input terminal is coupled to the output terminal of the on time control circuit 105 to receive the off trigger signal COT, and wherein based on the on trigger signal Ictr and the off trigger signal COT, the logic circuit 12 provides the low side control signal LG at the first output terminal, and provides the high side control signal HG at the second output terminal, wherein the low side switch LS on time period Ton is controlled to be constant, and wherein the on time period Ton is initiated by the on trigger signal Ictr, and is terminated by the off trigger signal COT.

In one embodiment, the logic circuit 12 comprises: a RS flip-flop 106 having a set terminal "S", a reset terminal "R" and an output terminal "Q", wherein the set terminal "S" is coupled to the output terminal of the comparator 104 to receive the on trigger signal Ictr, and the reset terminal "R" is coupled to the output terminal of the on time control circuit 105 to receive the off trigger signal COT, and wherein based on the on trigger signal Ictr and the off trigger signal COT, the RS flip-flop 106 provides the low side control signal LG at the output terminal "Q"; and an inverter 107 having an input terminal and an output terminal, wherein the input terminal is coupled to the output terminal "Q" of the RS flip-flop 106 to receive the low side control signal LG, and wherein based on the low side control signal LG, the inverter 107 provides the high side control signal HS at the output terminal, wherein the high side control signal HS has an opposite phase with the low side control signal LG. In one embodiment, the logic circuit 12 further comprises a dead time control circuit (not shown in FIG. 3). The dead time control circuit controls the high side switch HS and low side switch LS being off for a preset dead time period after the high side switch HS is turned off, and after the low side switch LS is turned off.

Figure 2:
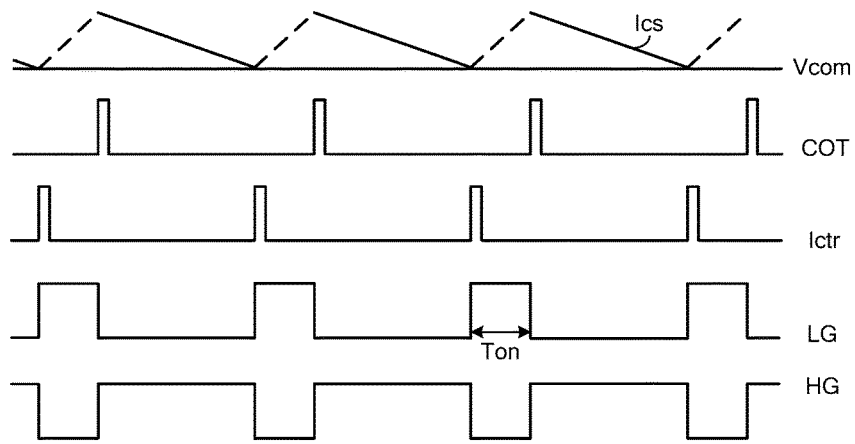
FIG. 2 shows waveforms of signals of the boost converter 10 in FIG. 1.

FIG. 2 shows waveforms of signals of the boost converter 10 in FIG. 1. The operation of the boost converter 10 is described referring to FIGS. 1 and 2. The high side switch HS and the low side switch LS are turned on and off alternatively. During when the high side switch HS is on and the low side switch LS is off, the current flowing through the high side switch HS decreases, so as the current sense signal Ics. When the current sense signal Ics decreases to the voltage control signal Vcom, the comparator 104 flips and provides the on trigger signal Ictr to set the RS flip-flop 106. As a result, the RS flip-flop 106 outputs the low side control signal LG to turn on the low side switch LS. Meanwhile, the inverter 107 outputs the high side control signal HG to turn off the high side switch HS. After that, the current flowing through the inductor L1, i.e., the current flowing through the low side switch LS, increases. After the constant time period Ton, the on time control circuit 105 provides the off trigger signal COT to reset the RS flip-flop 106. As a result, the RS flip-flop 106 outputs the low side control signal LG to turn off the low side switch LS. Meanwhile, the inverter 107 outputs the high side control signal HG to turn on the high side switch HS. After that, the current flowing through the inductor L1, i.e., the current flowing through the high side switch HS, decreases. When the current sense signal Ics indicative of the current flowing through the high side switch HS decreases to the voltage control signal Vcom, the comparator 104 flips and provides the on trigger signal Ictr to set the RS flip-flop 106 again, and the operation repeats.

As can be seen from the above description, the premise of the constant on time period Ton is fixed input voltage Vin and fixed output voltage Vout. In other words, the on time period Ton varies when the input voltage Vin or the output voltage Vout changes.

It is known to persons of ordinary skills in the art that a time period that the high side switch HS takes to complete an on-and-off cycle, or a time period that the low side switch LS takes to complete an on-and-off cycle, is defined as a switching cycle of the boost converter. Meanwhile, a reciprocal of the switching cycle is defined as a switching frequency of the boost converter. Persons of ordinary skills in the art should know that if the low side switch LS on time period is constant during each switching cycle, an off time period of the low side switch LS will be varying to accommodate the varying switching input voltage Vin, the varying output voltage Vout or the varying load. As a result, the switching frequency of the converter varies.

In order to provide a boost converter with constant switching frequency, the present invention provides an on time control circuit 105 to control the on time period Ton varying with the input voltage Vin and the output voltage Vout.

A duty cycle of the boost converter has a relationship with the input voltage Vin and the output voltage Vout as shown below:

$$DT = \frac{Ton}{T} = \frac{Vout - Vin}{Vout} \quad (1)$$

So the on time period Ton can be written as:

$$Ton = T \times \frac{Vout - Vin}{Vout} \quad (2)$$

As can be seen from EQ. (2), the switching cycle T, i.e., the switching frequency, would be constant if the on time period Ton is directly proportional to difference of the output voltage Vout and the input voltage Vin, and inversely proportional to the output voltage Vout.

Figure 3:
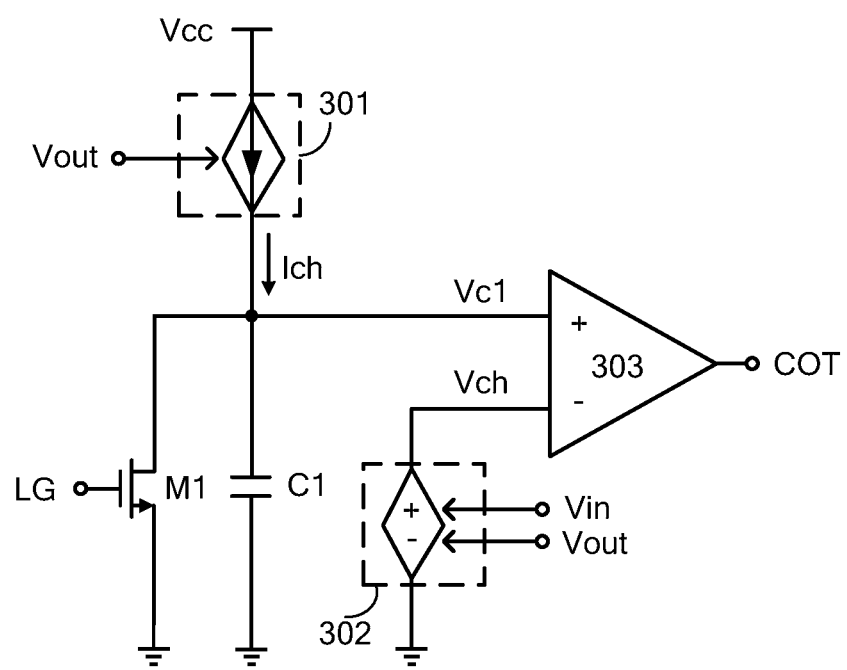
FIG. 3 schematically shows the on time control circuit 105 in accordance with an embodiment of the present invention.

FIG. 3 schematically shows the on time control circuit 105 in accordance with an embodiment of the present invention. As shown in FIG. 3, the on time control circuit 105 comprises: a variable current source circuit 301, having an input terminal, an output terminal and a control terminal, wherein the input terminal is configured to receive a power voltage Vcc of the control circuit 11, the control terminal is configured to receive the output voltage Vout, and wherein based on the power voltage Vcc and the output voltage Vout, the variable current source circuit 301 provides a variable current Ich proportional to the output voltage Vout; a capacitor C1 having a first terminal and a second terminal, wherein the first terminal is coupled to the output terminal of the variable current source circuit 301 to receive the variable current Ich, and the second terminal is connected to the ground reference GND; a first switch M1 having a first terminal, a second terminal and a control terminal, wherein the first terminal is coupled to the first terminal of the capacitor C1, the second terminal is connected to the ground reference GND, and the control terminal is configured to receive the low side control signal LG; a variable voltage source circuit 302, having a first terminal, a second terminal, a first control terminal and a second control terminal, wherein the second terminal is connected to the ground reference GND, the first control terminal is configured to receive the input voltage Vin, and the second control terminal is configured to receive the output voltage Vout, and wherein based on the input voltage Vin and the output voltage Vout, the variable voltage source circuit provides a variable voltage Vch at the first terminal, and wherein the variable voltage Vch is proportional to the difference of the output voltage Vout and the input voltage Vin; and an off control comparator 303 having a first input terminal, a second input terminal and an output terminal, wherein the first input terminal is coupled to the first terminal of the capacitor C1, and the second input terminal is coupled to the first terminal of the variable voltage source circuit 302, and wherein based on a voltage signal Vc1 across the capacitor C1 and the variable voltage signal Vch, the off control comparator 303 provides the off trigger signal COT at the output terminal.

In the example of FIG. 3, the value of the variable current is Ich=K1×Vout, and the value of the variable voltage is Vch=K2×(Vout−Vin), wherein K1 and K2 are constant coefficient. When the low side switch LS is turned on at a pulse of the on trigger signal COT as shown in FIG. 2, the first switch M1 is turned off by the low side control signal LG. Then, the variable current Ich charges the capacitor C1 to increase the voltage Vc1. When the voltage Vc1 reaches the variable voltage Vch, the off trigger signal COT provides a pulse to reset the RS flip-flop 106. As a result, the RS flip-flop 106 provides the low side control signal LG to turn off the low side switch LS.

From the above description, the low side switch LS on time period Ton could be written as:

$$Ton = \frac{C1 \times Vch}{Ich} = C1 \times \frac{K2 \times (Vout - Vin)}{K1 \times Vout} \quad (3)$$

The capacitance of the capacitor C1 is constant in EQ. (3), so the on time period Ton is directly proportional to the difference of the output voltage Vout and the input voltage Vin, and is inversely proportional to the output voltage Vout.

Substituting EQ. (3) into EQ. (2), the switching cycle T of the boost converter is constant, so the switching frequency of the boost converter is constant too.

Figure 4:
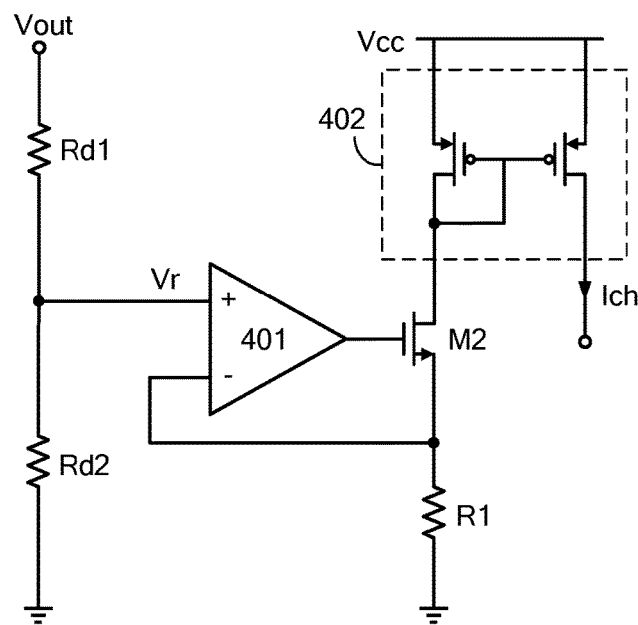
FIG. 4 schematically shows a variable current source circuit 301 in accordance with an embodiment of the present invention.

FIG. 4 schematically shows a variable current source circuit 301 in accordance with an embodiment of the present invention. As shown in FIG. 4, the variable current source circuit 301 comprises: a first resistor R1 having a first terminal and a second terminal, wherein the second terminal is connected to the ground reference GND; a second switch M2 having a first terminal, a second terminal and a control terminal, wherein the second terminal is coupled to the first terminal of the first resistor R1; a first error amplifier 401, having a first input terminal, a second input terminal and an output terminal, wherein the first input terminal is configured to receive a voltage signal Vr proportional to the output voltage Vout, the second input terminal is coupled to a connection node of the first resistor R1 and the second switch M2, and the output terminal is coupled to the control terminal of the second switch M2; and a first current mirror circuit 402, having a power terminal, a first terminal and a second terminal, wherein the power terminal is configured to receive the power voltage Vcc, the first terminal is coupled to the first terminal of the second switch M2, and the second terminal provides the variable current Ich proportional to the output voltage Vout.

Persons of ordinary skill in the art know that the voltages at the input terminals of an error amplifier are approximately equal. Thus, a voltage VR1 across the first resistor R1 is equal to the voltage Vr, which is VR1=Vr=K3×Vout, wherein K3 is a constant coefficient. So a current flowing through the resistor R1 could be written as IR1=VR1/R1=K3×Vout/R1. The variable current Ich is proportional to the current IR1 flowing through the resistor R1. If the ratio of the first current mirror circuit 402 is 1:K4, the variable current is: Ich=K4×IR1=K3×K4×Vout/R1=K5×Vout, wherein K5=K3×K4/R1.

In one embodiment, the voltage Vr is obtained by dividing the output voltage Vout with resistors Rd1 and Rd2, which is $$Vr = Vout \times \frac{Rd2}{Rd1 + Rd2}.$$

In one embodiment, the first current mirror circuit 402 comprises P type MOSFET.

Figure 5:
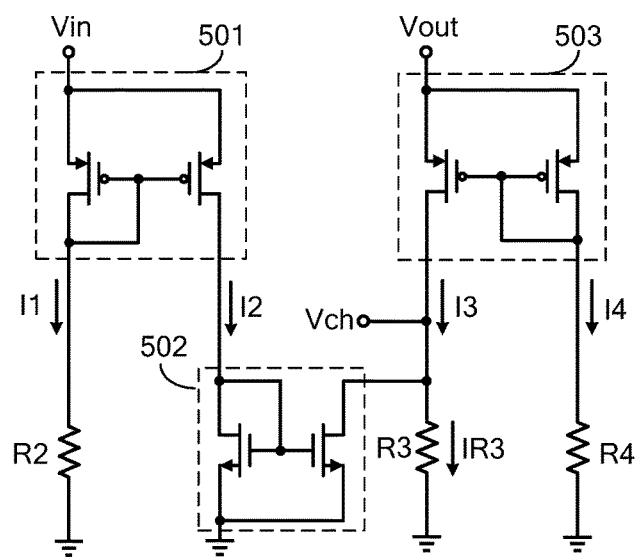
FIG. 5 schematically shows a variable voltage source circuit 302 in accordance with an embodiment of the present invention.

FIG. 5 schematically shows a variable voltage source circuit 302 in accordance with an embodiment of the present invention. As shown in FIG. 5, the variable voltage source circuit 302 comprises: a second resistor R2 having a first terminal and a second terminal, wherein the second terminal is connected to the ground reference GND; a second current mirror circuit 501 having a power terminal, a first terminal and a second terminal, wherein the power terminal is configured to receive the input voltage Vin, the first terminal is coupled to the first terminal of the second resistor R2; a third current mirror circuit 502 having a ground terminal, a first terminal and a second terminal, wherein the ground terminal is connected to the ground reference GND, and the first terminal is coupled to the second terminal of the second current mirror circuit 501; a third resistor R3 having a first terminal and a second terminal, wherein the first terminal is coupled to the second terminal of the third current mirror circuit 502, and the second terminal is connected to the ground reference GND; a fourth current mirror circuit 503 having a power terminal, a first terminal and a second terminal, wherein the power terminal is configured to receive the output voltage Vout, and the first terminal is coupled to the first terminal of the third resistor R3; and a fourth resistor R4 having a first terminal and a second terminal, wherein the first terminal is coupled to the second terminal of the fourth current mirror circuit 503, and the second terminal is connected to the ground reference GND; wherein the variable voltage signal Vch is generated at the first terminal of the third resistor R3.

Persons of ordinary skill in the art should know that a current I1 flowing through the second resistor R2 is approximately I1=Vin/R2. Meanwhile, a current I4 flowing through the fourth resistor R4 is I4=Vout/R4. If the second current mirror circuit 501, the third current mirror circuit 502 and the fourth current mirror circuit 503 all have a ratio of 1:1, then a current I2 provided by the second current mirror circuit 501 is I2=I1, a current I3 provides by the fourth current mirror 503 is I3=I4, and a current IR3 flowing through the resistor R3 is IR3=I2−I2. As a result, the variable voltage Vch has a value: Vch=(I3−I2)×R3=(Vout/R4−Vin/R2)×R3. If R2=R4=Requ, then $$Vch = \frac{R2}{Requ} \times (Vout - Vin) = K6 \times (Vout - Vin),$$

wherein K6=R3/Requ, which indicates that the value of the variable voltage Vch is proportional to the difference of the output voltage Vout and the input voltage Vin.

Figure 6:
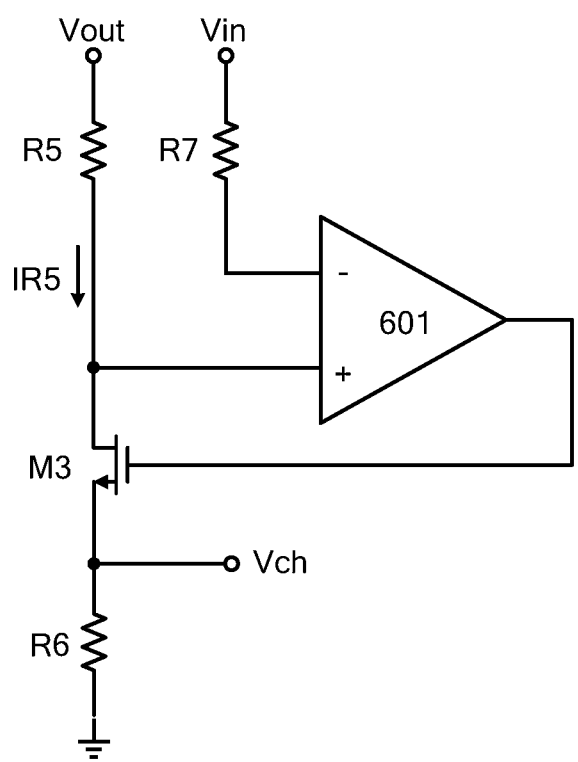
FIG. 6 schematically shows a variable voltage source circuit 302 in accordance with an embodiment of the present invention.

FIG. 6 schematically shows a variable voltage source circuit 302 in accordance with an embodiment of the present invention. As shown in FIG. 6, the variable voltage source circuit 302 comprises: a fifth resistor R5 having a first terminal and a second terminal, wherein the first terminal is configured to receive the output voltage Vout; a third switch M3 having a first terminal, a second terminal and a control terminal, wherein the first terminal is coupled to the second terminal of the fifth resistor R5; a sixth resistor R6 having a first terminal and a second terminal, wherein the first terminal is coupled to the second terminal of the third switch M3, and the second terminal is connected to the ground reference; a seventh resistor R7 having a first terminal and a second terminal, wherein the first terminal is configured to receive the input voltage Vin; and a second error amplifier 601 having a first input terminal, a second input terminal and an output terminal, wherein the first input terminal is coupled to the second terminal of the seventh resistor R7, the second input terminal is coupled to the second terminal of the fifth resistor R5, and the output terminal is coupled to the control terminal of the third switch M3.

In the example of FIG. 6, the voltage at the input terminals of the error amplifier 601 are approximately equal, thus a current IR5 flowing through the resistor R5 is IR5=(Vout−Vin)/R5. As a result, the variable voltage Vch is Vch=(Vout−Vin)×R6/R5=K7×(Vout−Vin), i.e., the variable voltage Vch has a value proportional to the difference of the output voltage Vout and the input voltage Vin, wherein K7=R6/R5, and K7 is a constant coefficient.

Figure 7:
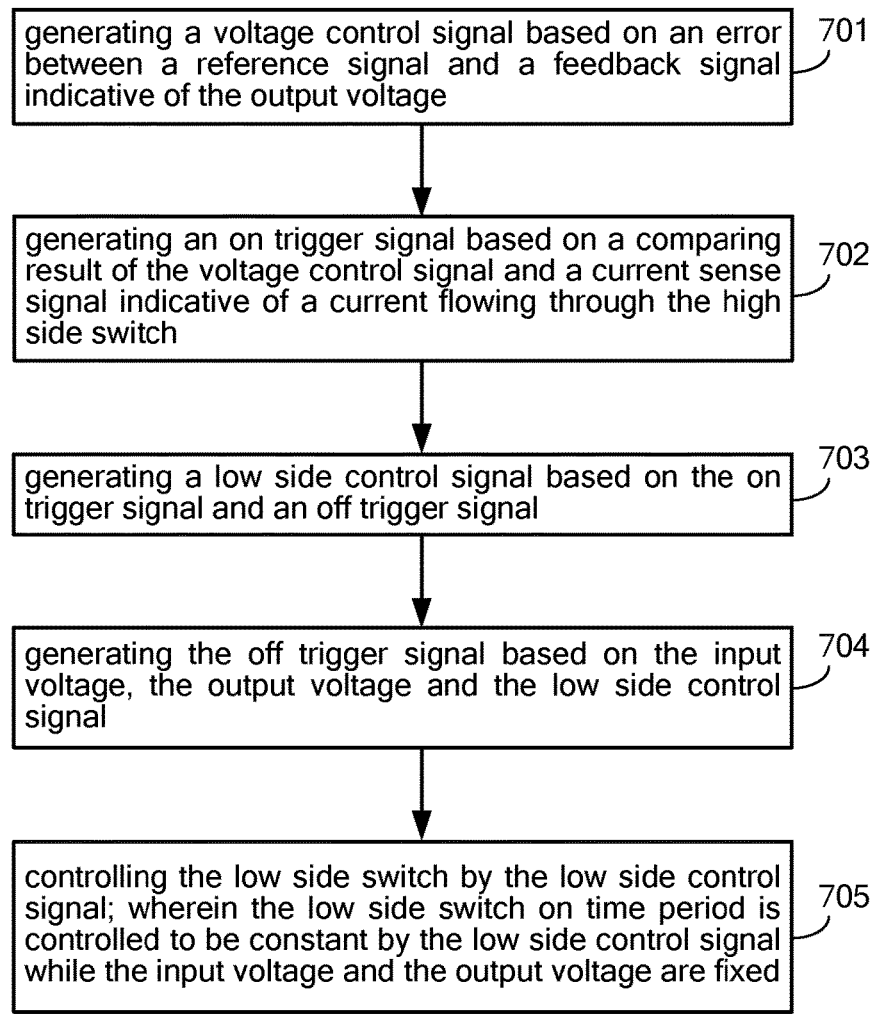
FIG. 7 shows a flow chart of a method 70 for controlling a boost converter in accordance with an embodiment of the present invention.

FIG. 7 shows a flow chart of a method 70 for controlling a boost converter in accordance with an embodiment of the present invention. The boost converter converts an input voltage to a desired output voltage. The boost converter may comprise an inductor, a high side switch coupled between the inductor and the output voltage, and a low side switch coupled between the inductor and a ground reference. The control method 70 comprises: step 701, generating a voltage control signal based on an error between a reference signal and a feedback signal indicative of the output voltage; step 702, generating an on trigger signal based on a comparing result of the voltage control signal and a current sense signal indicative of a current flowing through the high side switch; step 703, generating a low side control signal based on the on trigger signal and an off trigger signal; step 704, generating the off trigger signal based on the input voltage, the output voltage and the low side control signal; and step 705, controlling the low side switch by the low side control signal; wherein the low side switch on time period is controlled to be constant by the low side control signal while the input voltage and the output voltage are fixed.

In one embodiment, the method 70 further comprises generating the current sense signal by detecting a voltage drop across the high side switch.

In one embodiment, the step 704 further comprises: generating a variable current proportional to the output voltage; generating a variable current proportional to the output voltage; generating a variable voltage proportional to a difference of the output voltage and the input voltage; charging a capacitor when the low side switch is turned on; discharging the capacitor when the low side switch is off; and generating a low side control signal to control the low side switch based on a comparison result of the variable voltage and a voltage across the capacitor.

The present invention provides boost converters without current loop. The presented boost converter has a high bandwidth so as to promise excellent performance during load transient. Meanwhile, the switching frequency of the presented boost converter is constant with fixed input voltage and output voltage. Furthermore, the efficiency of the presented boost converter under light load is improved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A boost converter, comprising:
   an input port configured to receive an input voltage;
   an output port configured to provide an output voltage;
   an inductor having a first terminal coupled to the input port to receive the input voltage, and a second terminal;
   a high side switch having a first terminal coupled to the second terminal of the inductor, a second terminal coupled to the output port, and a control terminal configured to receive a high side control signal;
   a low side switch having a first terminal coupled to the second terminal of the inductor, a second terminal coupled to a ground reference, and a control terminal configured to receive a low side control signal; and
   a control circuit having a first input terminal configured to receive a feedback signal indicative of the output voltage, a second input terminal configured to receive a reference signal, a first output terminal and a second output terminal respectively provide the high side control signal and the low side control signal based on the feedback signal and the reference signal; wherein
   the low side switch on time period is controlled to be constant by the low side control signal when the input voltage and the output voltage are fixed; and wherein
   the control circuit comprises:
      a variable current source circuit having an input terminal, an output terminal and a control terminal, wherein the input terminal is configured to receive a power voltage of the control circuit, the control terminal is configured to receive the output voltage, and based on the power voltage of the control circuit and the output voltage, the variable current source provides a variable current directly proportional to the output voltage at the output terminal;
      a capacitor having a first terminal and a second terminal, wherein the first terminal is coupled to the output terminal of the variable current source to receive a variable current, and the second terminal is connected to the ground reference;
      a first switch having a first terminal, a second terminal and a control terminal, wherein the first terminal is coupled to the first terminal of the capacitor, the second terminal is connected to the ground reference, and the control terminal is configured to receive the low side control signal;
      a variable voltage source circuit having a first terminal, a second terminal, a first control terminal and a second control terminal, wherein the second terminal is connected to the ground reference, the first control terminal is configured to receive the input voltage, and the second control terminal is configured to receive the output voltage, and wherein based on the input voltage and the output voltage, the variable voltage source circuit provides a variable voltage at the first terminal, and wherein the variable voltage is proportional to the difference of the output voltage and the input voltage; and
      an off control comparator having a first input terminal, a second input terminal and an output terminal, wherein the first input terminal is coupled to the first terminal of the capacitor, and the second input terminal is coupled to the first terminal of the variable voltage source circuit, and wherein based on a voltage signal across the capacitor and the variable voltage signal, the off control comparator provides the off trigger signal at the output terminal to terminate the on time period of the low side power switch.

2. The boost converter of claim 1, wherein the control circuit further comprises a third input terminal configured to receive a current sense signal indicative of a current flowing through the high side switch, and wherein based on the current sense signal, the feedback signal and the reference signal, the control circuit provides the high side control signal to control the high side switch, and provides the low side control signal to control the low side switch.

3. The boost converter of claim 1, wherein the control circuit comprises:
   a feedback amplifier having a first input terminal, a second input terminal and an output terminal, wherein the first input terminal is configured to receive the reference signal, the second input terminal is configured to receive the feedback signal, and the output terminal is configured to provide a voltage control signal indicative of an error between the reference signal and the feedback signal;

a feedback comparator having a first input terminal, a second input terminal and an output terminal, wherein the first input terminal is configured to receive a current sense signal indicative of a current flowing through the high side switch, the second input terminal is coupled to the output terminal of the feedback amplifier to receive the voltage control signal, and the output terminal is configured to provide an on trigger signal based on the current sense signal and the voltage control signal;

an on time control circuit having a first input terminal, a second input terminal, a third input terminal and an output terminal, wherein the first input terminal is configured to receive the input voltage, the second input terminal is configured to receive the output voltage, the third input terminal is configured to receive the low side control signal, and the output terminal is configured to provide the off trigger signal based on the input voltage, the output voltage and the low side control signal; and a logic circuit having a first input terminal, a second input terminal, a first output terminal and a second output terminal, wherein the first input terminal is coupled to the output terminal of the comparator to receive the on trigger signal, the second input terminal is coupled to the output terminal of the on time control circuit to receive the off trigger signal, the first output terminal and the second output terminal are configured to respectively provide the high side control signal and the low side control signal based on the on trigger signal and the off trigger signal; wherein the low side switch on time period is initiated by a pulse of the on trigger signal, and is terminated by a pulse of the off trigger signal.

4. The boost converter of claim 1, wherein the variable current source circuit comprises:

a first resistor having a first terminal and a second terminal, wherein the second terminal is connected to the ground reference;

a second switch having a first terminal, a second terminal and a control terminal, wherein the second terminal is coupled to the first terminal of the first resistor;

a first error amplifier having a first input terminal, a second input terminal and an output terminal, wherein the first input terminal is configured to receive a voltage signal proportional to the output voltage, the second input terminal is coupled to a connection node of the first resistor and the second switch, and the output terminal is coupled to the control terminal of the second switch; and a first current mirror circuit having a power terminal, a first terminal and a second terminal, wherein the power terminal is configured to receive the power voltage, the first terminal is coupled to the first terminal of the second switch, and the second terminal provides the variable current proportional to the output voltage.

5. The boost converter of claim 1, wherein the variable voltage source circuit comprises:

a second resistor having a first terminal and a second terminal, wherein the second terminal is connected to the ground reference;

a second current mirror circuit having a power terminal, a first terminal and a second terminal, wherein the power terminal is configured to receive the input voltage, the first terminal is coupled to the first terminal of the second resistor;

a third current mirror circuit having a ground terminal, a first terminal and a second terminal, wherein the ground terminal is connected to the ground reference, and the first terminal is coupled to the second terminal of the second current mirror circuit;

a third resistor having a first terminal and a second terminal, wherein the first terminal is coupled to the second terminal of the third current mirror circuit, and the second terminal is connected to the ground reference;

a fourth current mirror circuit having a power terminal, a first terminal and a second terminal, wherein the power terminal is configured to receive the output voltage, and the first terminal is coupled to the first terminal of the third resistor; and a fourth resistor having a first terminal and a second terminal, wherein the first terminal is coupled to the second terminal of the fourth current mirror circuit, and the second terminal is connected to the ground reference; wherein the variable voltage signal is generated at the first terminal of the third resistor.

6. The boost converter of claim 1, wherein the variable voltage source circuit comprises:

a fifth resistor having a first terminal and a second terminal, wherein the first terminal is configured to receive the output voltage;

a third switch having a first terminal, a second terminal and a control terminal, wherein the first terminal is coupled to the second terminal of the fifth resistor;

a sixth resistor having a first terminal and a second terminal, wherein the first terminal is coupled to the second terminal of the third switch, and the second terminal is connected to the ground reference;

a seventh resistor having a first terminal and a second terminal, wherein the first terminal is configured to receive the input voltage; and a second error amplifier having a first input terminal, a second input terminal and an output terminal, wherein the first input terminal is coupled to the second terminal of the seventh resistor, the second input terminal is coupled to the second terminal of the fifth resistor, and the output terminal is coupled to the control terminal of the third switch.

7. A control circuit of a boost converter having a high side switch, a low side switch and an inductor, the control circuit comprising:

a feedback amplifier having a first input terminal, a second input terminal and an output terminal, wherein the first input terminal is configured to receive a reference signal, the second input terminal is configured to receive a feedback signal indicative of an output voltage of the boost converter, and the output terminal is configured to provide a voltage control signal indicative of an error between the reference signal and the feedback signal;

a feedback comparator having a first input terminal, a second input terminal and an output terminal, wherein the first input terminal is configured to receive a current sense signal indicative of a current flowing through the high side switch, the second input terminal is coupled to the output terminal of the feedback amplifier to receive the voltage control signal, and the output terminal is configured to provide an on trigger signal based on the current sense signal and the voltage control signal;

an on time control circuit having a first input terminal, a second input terminal, a third input terminal and an output terminal, wherein the first input terminal is configured to receive an input voltage of the boost converter, the second input terminal is configured to receive the output voltage, the third input terminal is configured to receive a low side control signal controlling on and off of the low side switch, and the output terminal is configured to provide an off trigger signal based on the input voltage, the output voltage and the low side control signal; and a logic circuit having a first input terminal, a second input terminal, a first output terminal and a second output terminal, wherein the first input terminal is coupled to the output terminal of the feedback comparator to receive the on trigger signal, the second input terminal is coupled to the output terminal of the on time control circuit to receive the off trigger signal, the first output terminal and the second output terminal are configured to respectively provide the high side control signal and the low side control signal based on the on trigger signal and the off trigger signal; wherein the low side switch on time period is initiated by the on trigger signal, and is terminated by the off trigger signal, and wherein the low side switch on time period is controlled to be constant when the input voltage and the output voltage are fixed; and wherein the on time control circuit comprises:

a variable current source circuit having an input terminal, an output terminal and a control terminal, wherein the input terminal is configured to receive a power voltage of the control circuit, the control terminal is configured to receive the output voltage, and based on the power voltage of the control circuit and the output voltage, the variable current source provides a variable current directly proportional to the output voltage;

a capacitor having a first terminal and a second terminal, wherein the first terminal is coupled to the output terminal of the variable current source to receive the variable current, and the second terminal is coupled to a ground reference;

a first switch having a first terminal, a second terminal and a control terminal, wherein the first terminal is coupled to the first terminal of the capacitor, the second terminal is connected to the ground reference, and the control terminal is configured to receive the low side control signal;

a variable voltage source circuit having a first terminal, a second terminal, a first control terminal and a second control terminal, wherein the second terminal is connected to the ground reference, the first control terminal is configured to receive the input voltage, and the second control terminal is configured to receive the output voltage, and wherein based on the input voltage and the output voltage, the variable voltage source circuit provides a variable voltage at the first terminal, and wherein the variable voltage is proportional to the difference of the output voltage and the input voltage; and an off control comparator having a first input terminal, a second input terminal and an output terminal, wherein the first input terminal is coupled to the first terminal of the capacitor, and the second input terminal is coupled to the first terminal of the variable voltage source circuit, and wherein based on a voltage signal across the capacitor and the variable voltage signal, the off control comparator provides the off trigger signal at the output terminal.

8. The control circuit of claim 7, wherein the variable current source circuit comprises:

a first resistor having a first terminal and a second terminal, wherein the second terminal is connected to the ground reference;

a second switch having a first terminal, a second terminal and a control terminal, wherein the second terminal is coupled to the first terminal of the first resistor;

an error amplifier having a first input terminal, a second input terminal and an output terminal, wherein the first input terminal is configured to receive a voltage signal proportional to the output voltage, the second input terminal is coupled to a connection node of the first resistor and the second switch, and the output terminal is coupled to the control terminal of the second switch; and a first current mirror circuit having a power terminal, a first terminal and a second terminal, wherein the power terminal is configured to receive the power voltage, the first terminal is coupled to the first terminal of the second switch, and the second terminal provides the variable current proportional to the output voltage of the boost converter.

9. The control circuit of claim 7, wherein the variable voltage source circuit comprises:

a second resistor having a first terminal and a second terminal, wherein the second terminal is connected to the ground reference;

a second current mirror circuit having a power terminal, a first terminal and a second terminal, wherein the power terminal is configured to receive the input voltage of the boost converter, the first terminal is coupled to the first terminal of the second resistor;

a third current mirror circuit having a ground terminal, a first terminal and a second terminal, wherein the ground terminal is connected to the ground reference, and the first terminal is coupled to the second terminal of the second current mirror circuit;

a third resistor having a first terminal and a second terminal, wherein the first terminal is coupled to the second terminal of the third current mirror circuit, and the second terminal is connected to the ground reference;

a fourth current mirror circuit having a power terminal, a first terminal and a second terminal, wherein the power terminal is configured to receive the output voltage of the boost converter, and the first terminal is coupled to the first terminal of the third resistor; and a fourth resistor having a first terminal and a second terminal, wherein the first terminal is coupled to the second terminal of the fourth current mirror circuit, and the second terminal is connected to the ground reference; wherein the variable voltage signal is generated at the first terminal of the third resistor.

10. The control circuit of claim 7, wherein the variable voltage source circuit comprises:

a fifth resistor having a first terminal and a second terminal, wherein the first terminal is configured to receive the output voltage of the boost converter;

a third switch having a first terminal, a second terminal and a control terminal, wherein the first terminal is coupled to the second terminal of the fifth resistor;

a sixth resistor having a first terminal and a second terminal, wherein the first terminal is coupled to the second terminal of the third switch, and the second terminal is connected to the ground reference;

a seventh resistor having a first terminal and a second terminal, wherein the first terminal is configured to receive the input voltage; and an error amplifier having a first input terminal, a second input terminal and an output terminal, wherein the first input terminal is coupled to the second terminal of the seventh resistor, the second input terminal is coupled to the second terminal of the fifth resistor, and the output terminal is coupled to the control terminal of the third switch.

11. A control method for a boost converter, wherein the boost converter converts an input voltage to an output voltage, and comprises an inductor, a high side switch coupled between the inductor and the output voltage, and a low side switch coupled between the inductor and a ground reference, the control method comprising:

generating a voltage control signal based on an error between a reference signal and a feedback signal indicative of the output voltage;

generating an on trigger signal based on a comparing result of the voltage control signal and a current sense signal indicative of a current flowing through the high side switch;

generating a low side control signal based on the on trigger signal and an off trigger signal;

generating the off trigger signal based on the input voltage, the output voltage and the low side control signal; and controlling the low side switch by the low side control signal; wherein the low side switch on time period is controlled to be constant while the input voltage and the output voltage are fixed; and wherein generating the off trigger signal based on the input voltage, the output voltage and the low side control signal comprises:

generating a variable current proportional to the output voltage;

generating a variable voltage proportional to a difference of the output voltage and the input voltage;

charging a capacitor when the low side switch is turned on;

discharging the capacitor when the low side switch is off; wherein the capacitor having a first terminal and a second terminal, wherein the first terminal is coupled to an output terminal of the variable current source to receive the variable current, and the second terminal is connected to the ground reference; and generating the low side control signal to control the low side switch based on a comparison result of the variable voltage and a voltage across the capacitor.

12. The control method of claim 11, further comprising generating the current sense signal by detecting a voltage drop across the high side switch.

* * * * *